United States Patent

Weinert

[11] Patent Number: 6,072,644
[45] Date of Patent: Jun. 6, 2000

[54] PROCESS AND CIRCUIT FOR READING WEAL MAGNETICALLY RECORDED SIGNALS

[75] Inventor: Volker Weinert, Taufkirchen, Germany

[73] Assignee: Agfa-Gevaert Aktiengesellschaft, Leverkusen, Germany

[21] Appl. No.: 08/913,695

[22] PCT Filed: Mar. 15, 1996

[86] PCT No.: PCT/EP96/01059

§ 371 Date: Sep. 10, 1997

§ 102(e) Date: Sep. 10, 1997

[87] PCT Pub. No.: WO96/31874

PCT Pub. Date: Oct. 10, 1996

[30] Foreign Application Priority Data

Apr. 7, 1995 [DE] Germany ............. 195 13 302

[51] Int. Cl.$^7$ ........................................ G11B 5/02
[52] U.S. Cl. .......................... 360/1; 360/3; 360/46; 360/67
[58] Field of Search ............... 360/1, 3, 46, 67; 330/104

[56] References Cited

U.S. PATENT DOCUMENTS

| | | | |
|---|---|---|---|
| 4,523,238 | 6/1985 | Keel et al. | 360/46 |
| 4,964,139 | 10/1990 | Wash et al. | 375/239 |
| 4,977,419 | 12/1990 | Wash et al. | 396/311 |
| 5,416,545 | 5/1995 | Izulsawa | 396/319 |

FOREIGN PATENT DOCUMENTS

| | | | |
|---|---|---|---|
| 1150644 | 4/1985 | U.S.S.R. | 360/67 |
| 1509989 | 9/1989 | U.S.S.R. | 360/67 |

OTHER PUBLICATIONS

"Circuits, Deviees, & Systems" by Smith et al, pp 282, 283, Dec. 1992.
Search Report for PCT/EP 96/01059, Jul. 1996.
"DOS Grobe Workbook Electronics", by nulramn, pp 1403–1426, Dec. 1989.
Abstract of Japanese Patent application #910293838, Apr. 1993.
Abstract of Japanese Application # 910297606, Apr. 1993.
Abstract of Japanese Application # 910297607, Apr. 1993.
Abstract of Japanese Application # 910228505, Feb. 1993.

Primary Examiner—Alan Faber
Attorney, Agent, or Firm—Milde, Hoffberg & Macklin, LLP

[57] ABSTRACT

A process and device are disclosed for reading weak magnetically recorded signals from a photographic film provided with a transparent thin magnetic layer. The signals from a magnetic read head obtained from the moving film are pre-amplified and the pre-amplified signals are digitized, filtered, differentiated and evaluated. The output of the magnetic read head (2) is supplied to the pre-amplifier (5) in short-circuit. This means that the internal resistance $R_i$ of the magnetic head is very high compared to the input resistance $R_e$ of the amplifier connected immediately downstream of the magnetic read head coil.

8 Claims, 1 Drawing Sheet

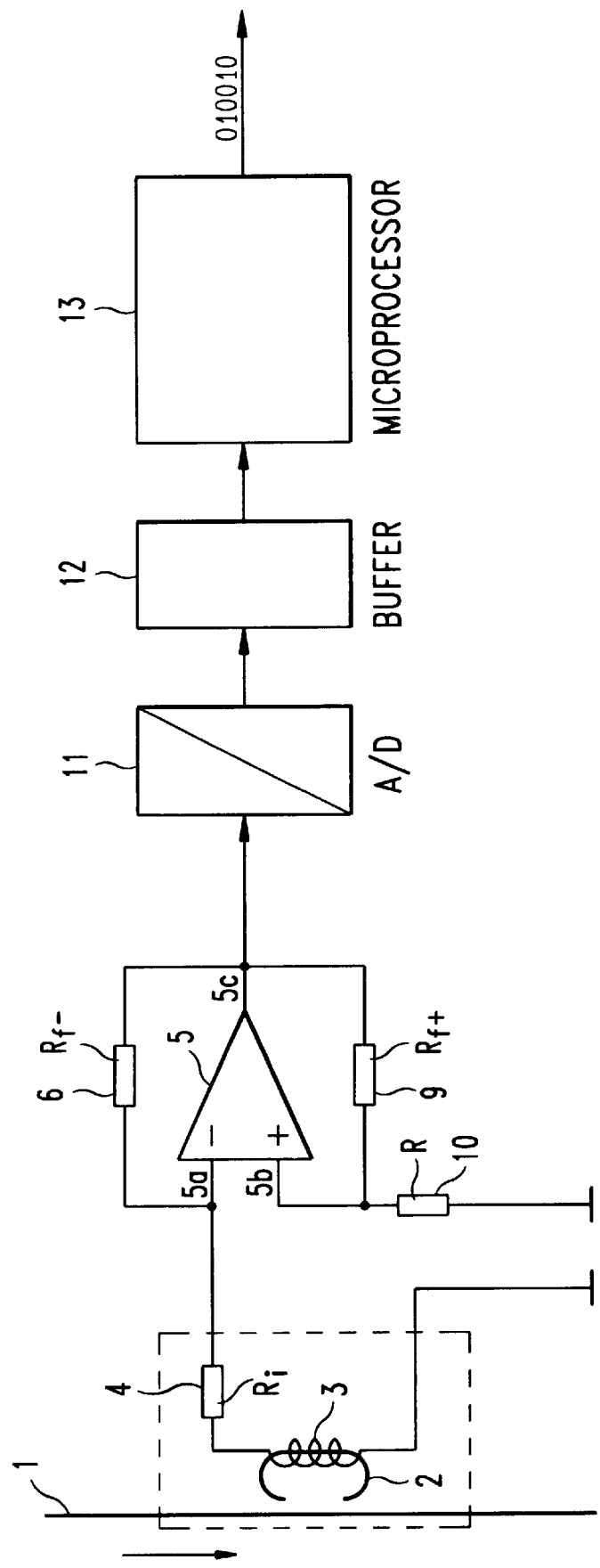

PROCESS AND CIRCUIT FOR READING WEAL MAGNETICALLY RECORDED SIGNALS

BACKGROUND OF THE INVENTION

The invention concerns a process for reading magnetically recorded signals from a photographic film provided with a transparent thin magnetic layer, and a device for carrying out this process.

A process of the kind mentioned for reading magnetically recorded signals is derived, for example, from the U.S. Pat. No. 4,964,139. The U.S. Pat. No. 4,977,419 discloses photographic films which have a very thin, transparent, surface-covering magnetic layer as an additional layer. On this magnetic layer the various signals can be recorded, including those recorded in the camera from the exposure process, which are helpful for the processing of the developed film. Normal devices for the detection of magnetic signals can be used for reading these magnetic signals.

It has been demonstrated, however, that the requirement for high transparency of the unexposed film after developing allows only for a magnetic layer with very little magnetic material. For this reason, the signals recorded with magnetic writing heads can deposit only extraordinarily weak magnetic fields and accordingly can induce only very small currents in the coils of movable magnetic heads opposite the magnetic layer. Devices normally used for reading magnetic impulses are designed for non-transparent magnetic layers and thus for those with much magnetic material which also deliver correspondingly strong signals. Signals readable from transparent magnetic layers may be weaker by a factor of at least 200 times than those from normal layers for recording sound or computer data.

SUMMARY OF THE INVENTION

The objective of the invention is thus to create a procedure suitable for reading extremely weak magnetic signals.

This objective is achieved by a process wherein said magnetic read head is operated through said pre-amplifying means in short-circuit, and wherein the pre-amplified signals are digitalized, filtered, differentiated and evaluated. Operating a magnetic read head by means of a pre-amplifier in short-circuit operation means that the internal resistance $R_i$ of the magnetic head is very great as opposed to the input resistance $R_e$ of the pre-amplifier connected immediately downstream of the magnetic head coil. When an operational amplifier connected to a resistance is employed according to an especially favorable embodiment of the invention for pre-amplification, the amplifier should have as high a no-load amplification $A_0$ of more than $10^6$ as possible with very low intrinsic noise. An amplifier of this type can carry very high ohms, for example feedback coupled with a resistance in the order of 10 MΩ or more, so that with a very good low-ohm sound-scanning head coil on the order of 150 ohms an input resistance on the order of 4–5 ohms is attained. Further details of the invention and of a device for implementation of the claimed process can be found in the dependent claims. An exemplary embodiment of a circuit according to the invention is illustrated in the attached Figure.

DESCRIPTION OF THE PREFERRED EMBODIMENT

In this FIG., 1 indicates the photographic film strip with the very thin magnetic layer which is led past a magnetic read head 2 with a coil 3 in a device for film processing, for example, a photographic printer. One of the problems is that both in the camera and in the process of printing, a constant relative speed between film 1 and magnetic head 2 cannot be ensured since the transport speed of the film is dependent on the operating conditions of the camera or of a printing device.

The internal resistance of the magnetic head coil 3 is represented symbolically by resistance 4 in the equivalent circuit diagram. Coil 3 is connected on one side to a ground and on the other to the negative input 5a of an operational amplifier 5. This operational amplifier has a very high no-load amplification $A_0$ of more than $10^6$—in particular of $5 \times 10^6$ and low intrinsic noise. The negative input 5a of this operational amplifier is connected by a feedback resistance 6 with output 5c of the operational amplifier. The positive input 5b of the operational amplifier is connected to a grounded resistance 10, while a positive feedback resistance 9 connects input 5b with output 5c. Output 5c of the operational amplifier 5 is then connected with an analog-digital converter 11, which sends the data to a data buffer 12 and finally to form of a microprocessor 13 for filtering, differentiation, and evaluation of the signal. Digital signals for controlling operational procedures for film 1 are then available at this point.

The desired pre-amplification by means of operational amplifier 5 results in the appearance of relatively high and easily processed signals at output 5c even with changing relative speeds between film 1 and magnetic head 2, especially at very low speeds. Short circuit operation allows for use of no-load amplification of more than $10^6$ even with low induced current. Damaging reactive effects of the highly amplified signal on the magnetization of the magnetic layer of film 1 are not expected, because the output current from the magnetic fields of the magnetic layer can be set low and the reactive effects cannot reach a level that would jeopardize the magnetization.

The resistance network 9 and 10 at the positive input of the operational amplifier 5 allows for a far-reaching compensation of the internal resistance $R_i$ of the magnetic read head coil 3 via a positive feedback, whereby the following equation is valid for the relationship of the resistance value:

$$\frac{R_{f-}}{R_i} \approx 0.8 \frac{R_{f+}}{R}$$

With this relationship of resistance values a compensation of approximately 80% is achieved, which further supports high amplification without instability; i.e., danger of oscillation.

In this way amplified signals with little intrinsic noise are then digitalized, temporarily recorded, and after a filtering and differentiation stage converted by an evaluation circuit into control signals. The effective filtering with specially adapted filters and differentiation suited to the task is possible only through this type of short-circuit amplification.

There has thus been shown and described a novel process and device for reading magnetically recorded signals which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

I claim:

1. In a process for reading magnetically recorded signals from a photographic film provided with a transparent thin magnetic layer, the signals from a magnetic read head being pre-amplified and the pre-amplified signals being evaluated, the improvement wherein said magnetic read head is operated through a pre-amplifier in short-circuit, and wherein the pre-amplified signals are digitized, filtered, differentiated and evaluated.

2. A process according to claim 1, wherein an operational amplifier is used as the pre-amplifier, said operational amplifier having a very high no-load amplification $A_0$ of more than $10^6$ and low intrinsic noise.

3. A process according to claim 2, wherein said operational amplifier is connected over a resistance network for positive feedback and partial compensation of the internal resistance of said magnetic read head.

4. In a circuit for reading magnetically recorded signals from a photographic film provided with a transparent thin magnetic layer, the signals from a magnetic read head being pre-amplified in a pre-amplifier and the pre-amplified signals being evaluated, the improvement wherein the input resistance (Re) of the pre-amplifier is very low in comparison to the internal resistance (Ri) of the magnetic read head and wherein means are provided for digitalizing, filtering, differentiating, and evaluation of the pre-amplified signals.

5. A circuit according to claim 4, wherein an operational amplifier is used as the pre-amplifier, said operational amplifier providing a no-load amplification $A_0$ of approximately $5 \times 10^6$.

6. A circuit according to claim 5, wherein the operational amplifier is connected to its positive input for partial compensation of the magnetic read head internal resistance $R_i$.

7. A circuit according to claim 6, wherein, in the resistance network, said positive feedback amounts to $$\frac{R_{f-}}{R_i} \approx 0.8 \frac{R_{f+}}{R},$$

which means that the compensation is approximately 80%, wherein:

Rf− is the feedback resistance at the negative input terminal of the operational amplifier, Ri is the internal resistance of the magnetic read head, Rf+ is the feedback resistance at the positive input of the operational amplifier, and R is the resistance between ground and the positive input of the operational amplifier.

8. A circuit according to claim 4, wherein the output terminal of said operational amplifier is connected to an analog-digital converter of a filtering and differentiating means and a signal evaluating device.

* * * * *